US005329296A

United States Patent [19]

Orth et al.

[11] Patent Number: 5,329,296

[45] Date of Patent: Jul. 12, 1994

[54] IMAGING SYSTEM FOR A PRINTING PRESS

[75] Inventors: Kevin W. Orth, Des Plaines; Walter J. Pelczarski, Downers Grove; Garry F. Tupek, Naperville, all of Ill.

[73] Assignee: Rockwell International Corporation, El Segundo, Calif.

[21] Appl. No.: 74,903

[22] Filed: Jun. 10, 1993

Related U.S. Application Data

[62] Division of Ser. No. 845,297, Mar. 2, 1992.

[51] Int. Cl.[5] .......... G11B 9/00

[52] U.S. Cl. .......... 346/74.2

[58] Field of Search .......... 346/74.2

[56] References Cited

U.S. PATENT DOCUMENTS 4,060,811 11/1977 Faucz .......... 346/74.1

4,392,754 7/1983 Adler .......... 346/74.2 X 4,392,755 7/1983 Donoso .......... 346/74.2 X 4,935,403 6/1990 Yamaoki et al. .......... 346/74.2 X

*Primary Examiner*—George H. Miller, Jr.

*Attorney, Agent, or Firm*—C. B. Patti; H. F. Hamann

[57] ABSTRACT

An imaging system (12) for a printing press (10) having an imaging cylinder (44) having a magnetically addressable outer surface (46), a magnetically permeable film (48), a device (50) for passing the film (48) over at least a portion of the outer surface (46) of the imaging cylinder (44), a device (52) for writing magnetic information through the film (48) onto the outer surface (46) of the imaging cylinder (44), a device (56) for passing a magnetic particulate material (58) onto the film (48) over the magnetic information on the cylinder (44) to form an image (80) of the particulate material (58) on the film (48), and a device (62) for bonding the particulate material (58) onto the film (48).

13 Claims, 6 Drawing Sheets

IMAGING SYSTEM FOR A PRINTING PRESS

This is a division of U.S. application Ser. No. 845,297, filed Mar. 2, 1992.

BACKGROUND OF THE INVENTION

The present invention relates to imaging systems for a printing press.

In the past, printing presses have utilized plate cylinders in conjunction with blanket cylinders in order to form printed images on a paper web as the web passes the blanket cylinders. Such plate cylinders have utilized plates containing the image for printing, and the plates have been secured to the outer surface of the plate cylinders for use. The plate cylinders have passed an ink image onto the blanket cylinders which in turn print the images on the web.

The formation of the plates has been time consuming, and it has been difficult to secure the plates onto the plate cylinders through the use of some locking mechanism. It has been particularly tedious and time consuming to maintain registration between a plurality of associated plate images, thus rendering the printing press more inefficient.

More recently, it has been proposed to form the printing image directly upon a print cylinder, rather than forming separate plates. The print cylinders are then associated with the blanket cylinders, and the printing image is transferred from the print cylinders to the blanket cylinders for printing the image onto the web. However, many difficulties are still found to exist in such direct-to-press imaging systems, and much improvement is needed in such presses to obtain a satisfactory result. For example, such presses have required extensive cleaning of the print cylinders after their use, and have also required surface preparation of the print cylinders prior to placement of the image on the outer surface of the print cylinders.

SUMMARY OF THE INVENTION

A principal feature of the present invention is the provision of an improved imaging system for a printing press.

The imaging system of the present invention comprises, an imaging cylinder having a magnetically addressable outer surface, a magnetically permeable film, means for passing the film over at least a portion of the outer surface of the imaging cylinder, and means for writing magnetic information through the film onto the outer surface of the imaging cylinder.

A feature of the present invention is the provision of means for passing a magnetic particulate material onto the film over the magnetic information on the cylinder.

Another feature of the present invention is that an image is formed by the particulate material on the film.

Yet another feature of the invention is the provision of means for bonding the particulate material onto the film.

A further feature of the invention is that a printing image is formed by the system on the outer surface of the film.

Still another feature of the invention is that the particulate material may be fused onto the outer surface of the film.

Another feature of the invention is that the writing means may comprise at least one magnetic write head.

Yet another feature of the invention is that the film may be severed into segments.

Still another feature of the invention is that the film segments may be placed on an outer surface of a print cylinder which transfers a print image to an associated blanket cylinder for printing the image onto a paper web.

Yet another feature of the invention is that the film segment may be releasably secured to the outer surface of the print cylinder by adhesive, such as pressure-sensitive adhesive or heat activated adhesive.

A feature of the invention is that the film segment may be easily removed from the print cylinder after printing has been completed.

Another feature of the invention is that the outer surface of the film may comprise a hydrophilic material.

Yet another feature of the invention is that the particulate material may comprise an oleophilic material.

Still another feature of the invention is that the particulate material may be blown onto the outer surface of the film.

Another feature of the invention is that provision of means for supplying information to the writing means.

Yet another feature of the invention is that the supplying means may comprise a computer.

A feature of the invention is that the printing image may be formed directly onto the printing cylinder.

Another feature of the invention is that the image may be formed in a more rapid and simplified manner onto the print cylinder.

A feature of the invention is the elimination of the necessity of a plate for a plate cylinder.

Yet another feature of the invention is that the image may be formed on the print cylinder at a reduced cost.

Still another feature of the invention is that the print image may be automatically formed on the print cylinder.

Another feature of the invention is that improved registration may be obtained between a plurality of print and blanket cylinders through use of the system of the present invention.

A further feature of the invention is that surface preparation of the print cylinder is minimized by the imaging system of the present invention.

Yet another feature of the invention is that the necessity of cleaning the outer surface of the print cylinder is eliminated by the imaging system of the present invention.

A further feature of the invention is that the film need only be removed to place the press in a condition for subsequent use.

Another feature of the invention is that the elimination of cleaning of the outer surface of the print cylinder enhances the wear of the print roll.

Yet another feature of the invention is that different widths of imaged film may be placed on the print cylinder, such as page wide films or press wide films.

Still another feature of the invention is that once a film has been removed from the print cylinder after a press run, it may be disposed in a simplified manner, and thus eliminates the need of a scrubbing or solvent cleaners for the print roll.

A feature of the invention is that the particulate image may be formed directly on the outer surface of the imaging roll, and may be transferred from the cylinder onto a magnetically addressable film.

Yet another feature of the invention is that the particulate material and film may be given charges of opposite polarity to achieve this result.

A feature of the invention is that the film may be placed directly on the print roll prior to imaging, and the particulate image may be formed directly onto the film over the roll.

Another feature of the invention is that placement of the film onto the cylinder prior to the formation of the image eliminates possible distortion of the film during placement onto the roll, such as by heat applied to the film prior to placement.

Yet another feature of the invention is that the film may be magnetically addressable, and the magnetic image may be placed on an outer surface of an imaging device which need not be a cylinder.

Further features will become more fully apparent in the following description of the embodiments of this invention, and from the appended claims.

DESCRIPTION OF THE PREFERRED EMBODIMENTS

Figure 1:
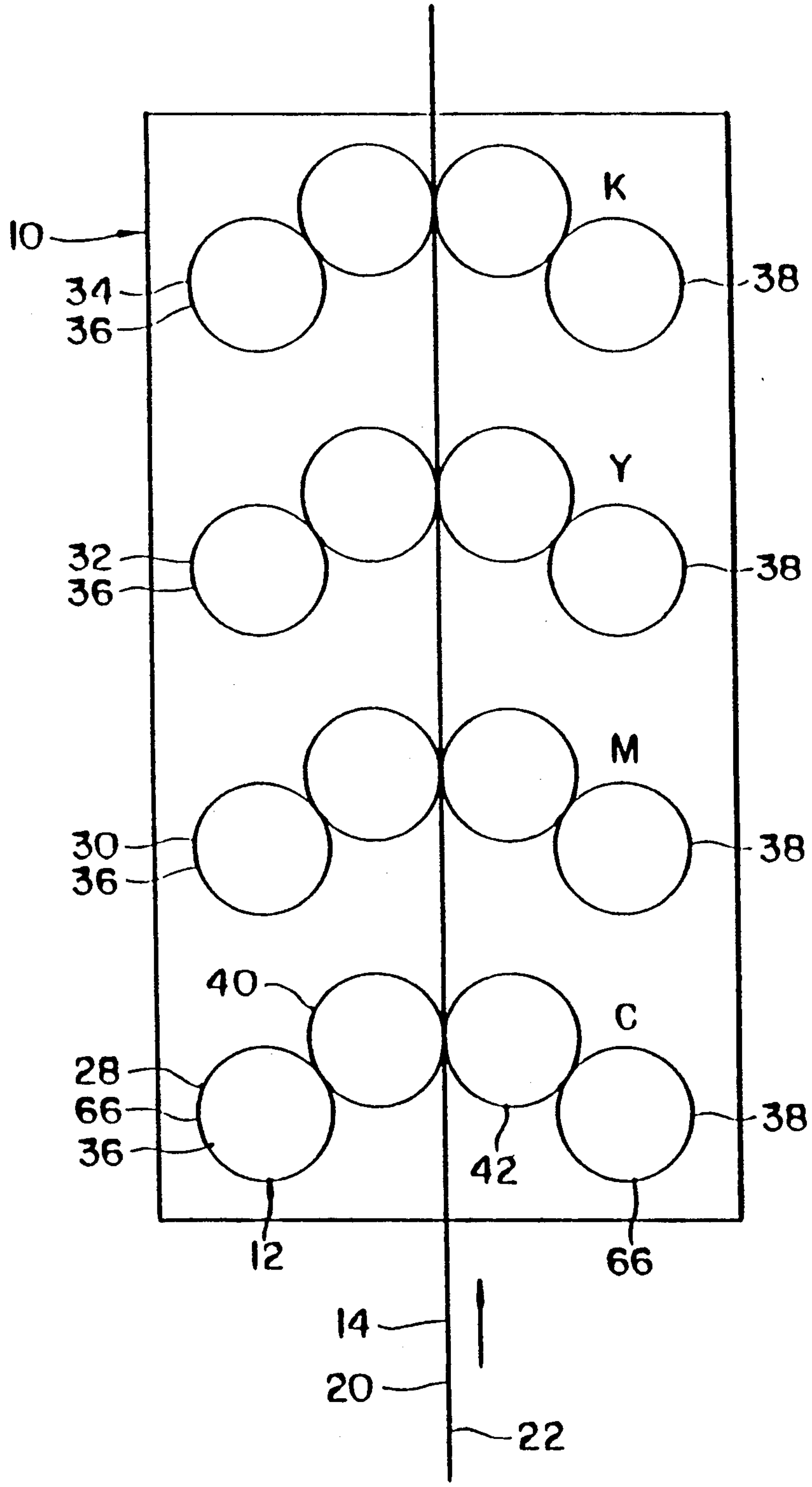
FIG. 1 is a diagrammatic view of a printing press having an imaging system of the present invention.

Referring now to FIG. 1, there is shown a printing press generally designated 10 having an imaging system generally designated 12 to facilitate printing an image on a paper web 14. The press 10 has a plurality of printing units 28, 30, 32, and 34 for printing different colors of ink on the web 10. As shown, the printing unit 28 may print an ink having a color Cyan C, the printing unit 30 may print an ink having a color magenta M, the printing unit 32 may print an ink having the color Yellow Y, and the printing unit 34 may print an ink having a color black K in a four-color press 10.

The printing units 28, 30, 32, and 34 each have a plurality of print rolls or cylinders 36 associated with a blanket cylinder or roll 40. During printing by the press 10, an image of the ink is transferred from the print rolls 36 to the associated blanket rolls 40 to print the image on one surface 20 of the web 14. In addition, the press 10 may have a plurality of printing units having a plurality of print rolls 38 associated with a plurality of blanket rolls or cylinders 42 on an opposed side 22 of the web 14 in order to transfer the ink image from the print rolls 38 to the blanket rolls 42 for printing an image on the other surface 22 of the web 10. The imaging of the print rolls is discussed below, and the discussion is equally applicable to either the print rolls 36 or the print rolls 38 on the opposed sides 20 and 22 of the web 14.

Figure 2:
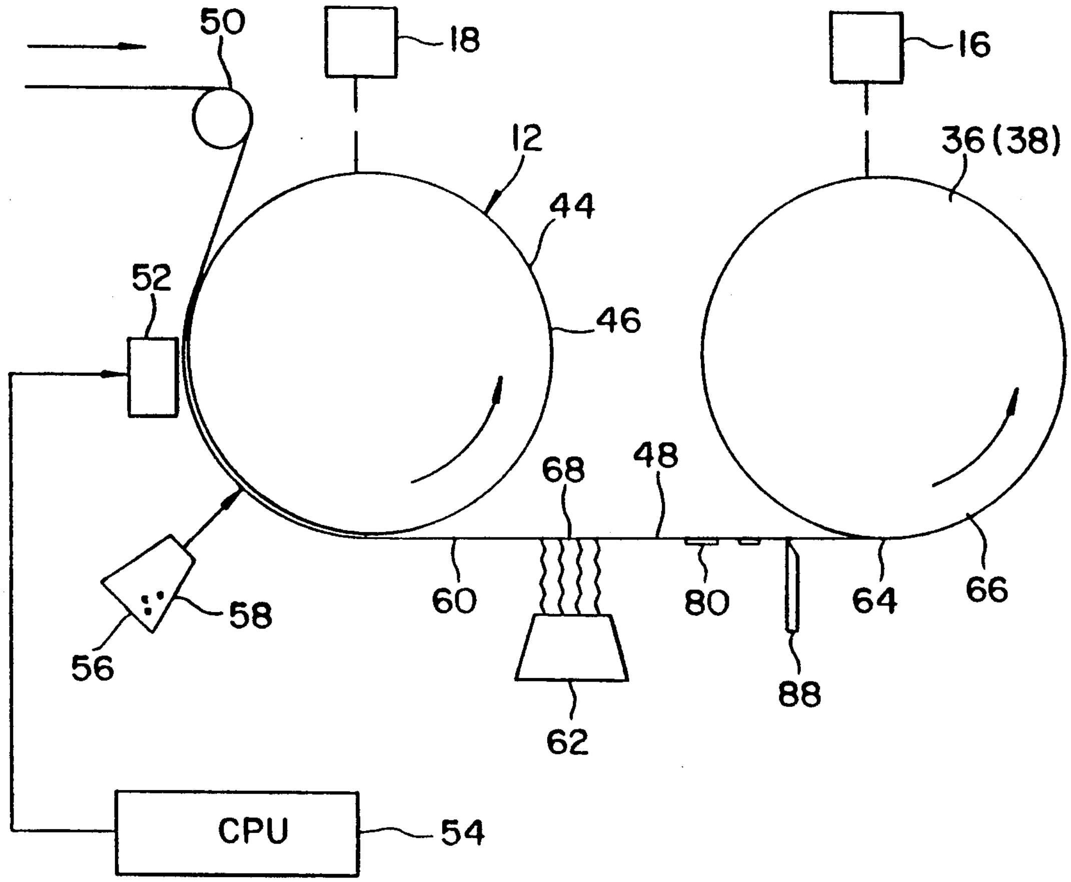
FIG. 2 is a diagrammatic view of the imaging system of the present invention.

Referring now to FIG. 2, the imaging system 12 has an imaging cylinder or roll 44 associated with one of the print rolls 36 or 38. The image roll 44 has a magnetically addressable outer surface 46, such as nickel cobalt, which, if desired, may comprise an outer layer of the cylinder 44 defining the outer surface 46. The system 12 also has a magnetically permeable elongated film 48, such as a polymer film, such as the material MYLAR, a trademark of E. I. Dupont deNemours, a metal film, or foil. The system 12 has a roll 50 over which the film 48 passes, and which positions the film 48 around a portion of the outer surface 46 of the image roll 44.

The system 12 has one or more magnetic write heads 52 positioned over the film 48 for generating a magnetic field through the film 48, and writing magnetic imaging information on the outer surface 46 of the image or imaging roll 44. As shown, the system 12 may have a computer 54 or Central Processing Unit (CPU) having a Read Only Memory (ROM) and a Random Access Memory (RAM) connected to the write heads 52. The CPU supplies information from the memory of the CPU concerning a print image to the write heads 52 in order to form the magnetic image on the outer surface 46 of the image roll 44.

As shown, the film 48 passes beneath a device 56 for passing a magnetic particulate material 58, such as a toner which is susceptible to magnetic fields onto an outer surface 60 of the film 48, and the magnetic information formed on the outer surface 46 of the image cylinder 44 causes the particulate material to form a pattern in the shape of the desired print image on the outer surface 60 of the film 48. During this time, the image cylinder 44 may be rotated by a suitable motor 18.

Figure 6:
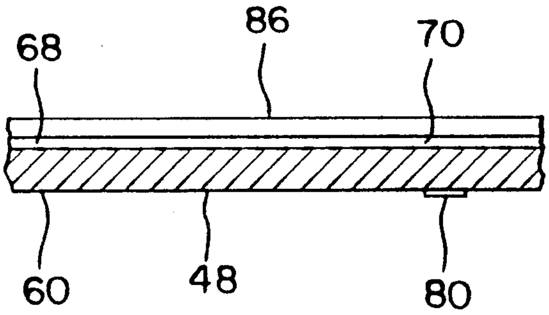
FIG. 6 is a fragmentary sectional view of a film for use in the imaging system of the present invention.

The film 48 then passes to a fusing system 62 which may bond the formed image of particulate material with the application of heat onto the outer surface 60 of the film 48. The film 48 then passes to the print cylinder 36 or 38 where the film 48 is severed into segments 64 by a suitable knife 88, and the segments 64 are sequentially placed upon an outer surface 66 of the print roll 36 or 38. During this time, the print cylinder 36 or 38 may be rotated by a suitable motor 16. With reference to FIG. 6, an image 80 of particulate material 58 is formed on the outer surface 60 of the film 48, and an inner surface 68 of the film 48 may have a suitable adhesive 70, such as a pressure-sensitive or heat activated adhesive for releasably securing the film 48 onto the outer surface 66 of the print roll 36 or 38. In the case of the heat activated adhesive 70, the film 48 may be placed upon the outer surface 66 of the print roll 36 or 38, and then the film 48 is heated in order to activate the adhesive 70 in order to secure the film 48 in place on the print roll 36 or 38. Once the printing has been completed, the film 48 and adhesive 70 may be heated again in order to release the film 48 which may then be removed from the print roll 36 or 38. The film 48 may have a release sheet 86 releasably covering the adhesive, with the release sheet 86 being removed from the adhesive 70 prior to placement of the film 48 on the print cylinder 36 or 38. In an alternative form, the outer surface 60 of the film or backing 48 may have a release coating, such as silicone, and the film 48 may be wound into a roll with the adhesive 70 contacting the outer release surface 60 of the film 48.

In a preferred form, the outer surface 60 of the film 48 is hydrophilic and the particulate material 58 is oleophilic in to form the printing image 80 and non-image areas for the control of ink and water from a suitable ink supply and dampening system in order to transfer the printed image to the blanket roll 40 or 42. In this case, the particulate material 58 forms the desired image to be printed on the web 14. In an alternative form, the outer surface 66 of the film 48 is oleophilic, and the particulate material is hydrophilic, such that the non-image areas on the outer surface of the film 48 forms the print image for placement on the printed web 14. The hydrophilic surface 60 of the film 48 may be provided by a metalized polymer film or metallic film, or by corona treatment of the outer surface 60 of the film 48.

The image cylinder 44 may remain at a fixed position relative to the print cylinder 36 or 38, or the image cylinder 44 may be removed and placed at a remote position relative to the print cylinder 36 or 38.

In this manner, the print image 80 is directly formed on the outer surface 66 of the print rolls 36 or 38 in the direct-to-press system 14. The system 12 automatically forms the image of particulate material through use of the computer 54 in a simplified and rapid manner, and eliminates the need for plates for plate cylinders which render the preparation of the press 10 relatively inefficient. The system 12 of the invention improves the registration of the print images in the various print cylinders 36 or 38 which form the images of the different colors of ink. The system 12 of the invention eliminates the necessity of surface preparation of the print rolls 36 or 38, and the film 48 may be readily removed after the printing has been completed. The used film 48 may be disposed of in a simplified manner. In addition, the film 48 may be placed upon the print rolls 36 or 38 in an improved and precise manner. The system 12 also eliminates the need to clean the outer surface of the print rolls 36 and 38 after the printing has been completed, and also reduces the wear of the print rolls 36 and 38 otherwise caused by cleaning. The system 12 also eliminates the need for using scrubbing or solvent agents to clean the outer surface 66 of the print rolls 36 and 38.

Figure 3:
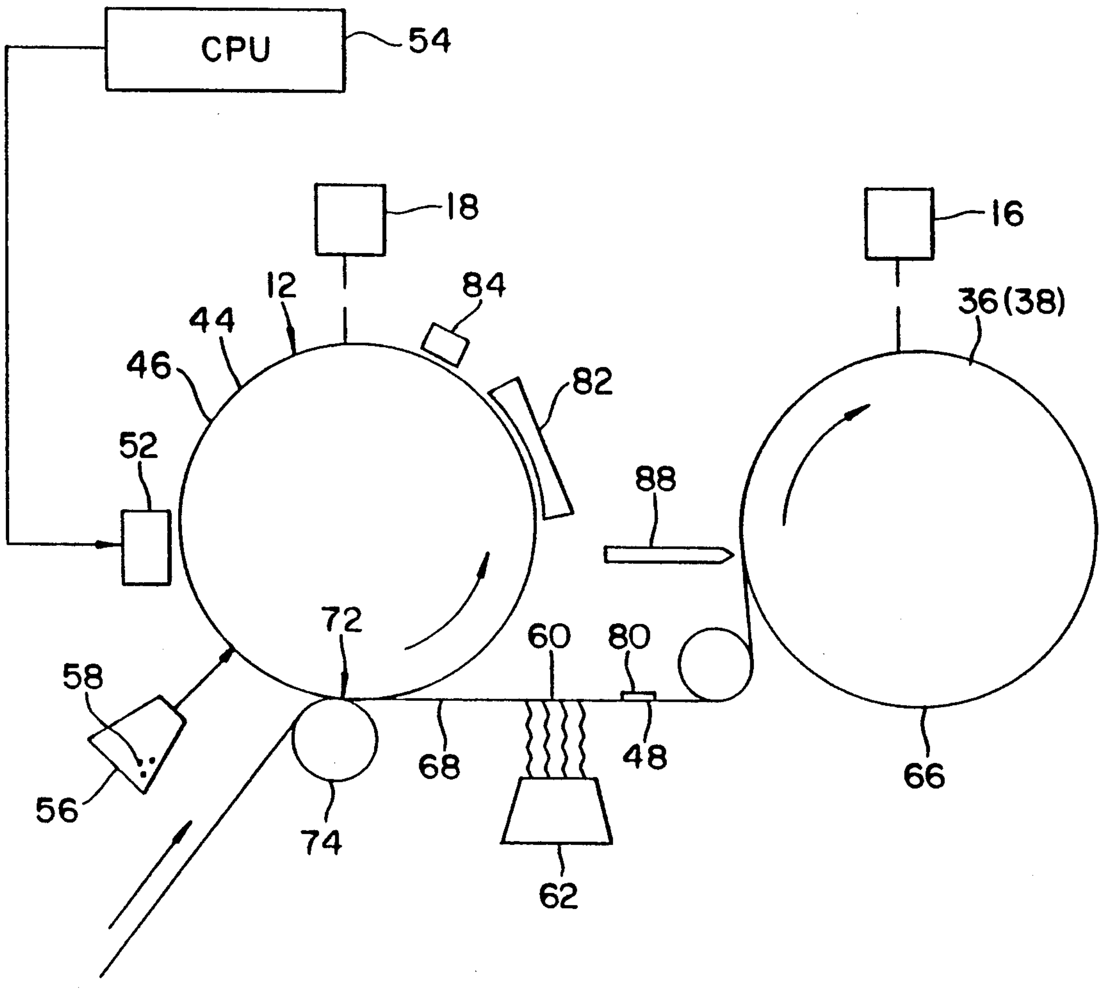
FIG. 3 is a diagrammatic view of another embodiment of the imaging system of the present invention.

Another embodiment of the present invention is illustrated in FIG. 3, in which like reference numerals designate like parts. In this embodiment, the system 12 also has an imaging or image cylinder 44 having a magnetically addressable outer surface 46, as previously described. The system 12 has at least one magnetic write head 52 controlled by the CPU which supplies information to the write heads 52 for forming a magnetic image on the outer surface 46 of the image cylinder 44. The magnetic information image then passes to the toner device 56 which passes particulate material 58 of the type previously described onto the outer surface 46 of the image roll 44 as the roll 44 rotates. In this case, the image is directly formed on the outer surface 46 of the image cylinder 44.

As shown, the system 12 has an elongated film 48 of the type previously described in connection with FIG. 2, and passes the film 48 between the nip 72 between a roller 74 and the outer surface 46 of the image roll 44. During this time, a charge of a first polarity, such as plus or minus, is given to the particulate material 58 as it passes from the toner device 56 to the image cylinder 44, and the film 48 is given a charge of an opposite plurality, such as negative or plus, such that the particulate material 58 is electrically attracted to the charged film 48 with a greater electrostatic force than the magnetic force of the particulate material 58 to the outer surface 46 of the image cylinder 44.

In this manner, the particulate image 80 is transferred from the outer surface 46 of the image cylinder 44 in the pattern of a print image to the outer surface 60 of the film 48. The film 48 is then passed through the fusing system 62 which bonds the image 80 to the outer surface 60 of the film 48. Finally, the film 48 is severed, and is releasably attached to the outer surface 66 of the print cylinder 36 or 38 in order to place the film with transferred image on the print cylinder 36 or 38, as previously described. The system 12 has a cleaning station 82 to remove the particulate material 58 from the outer surface 46 of the imaging cylinder 44, and a demagnetizing system 84 to remove the magnetic information from the cylinder 44 in order to prepare the imaging cylinder 44 to form a subsequent print image on the cylinder 44. In other respects, the system 12 of FIG. 3 operates substantially the same as the system 12 previously discussed in connection with FIG. 2. As before, the film 48 is removed from the print roll 36 or 38 after printing has been completed.

Figure 4:
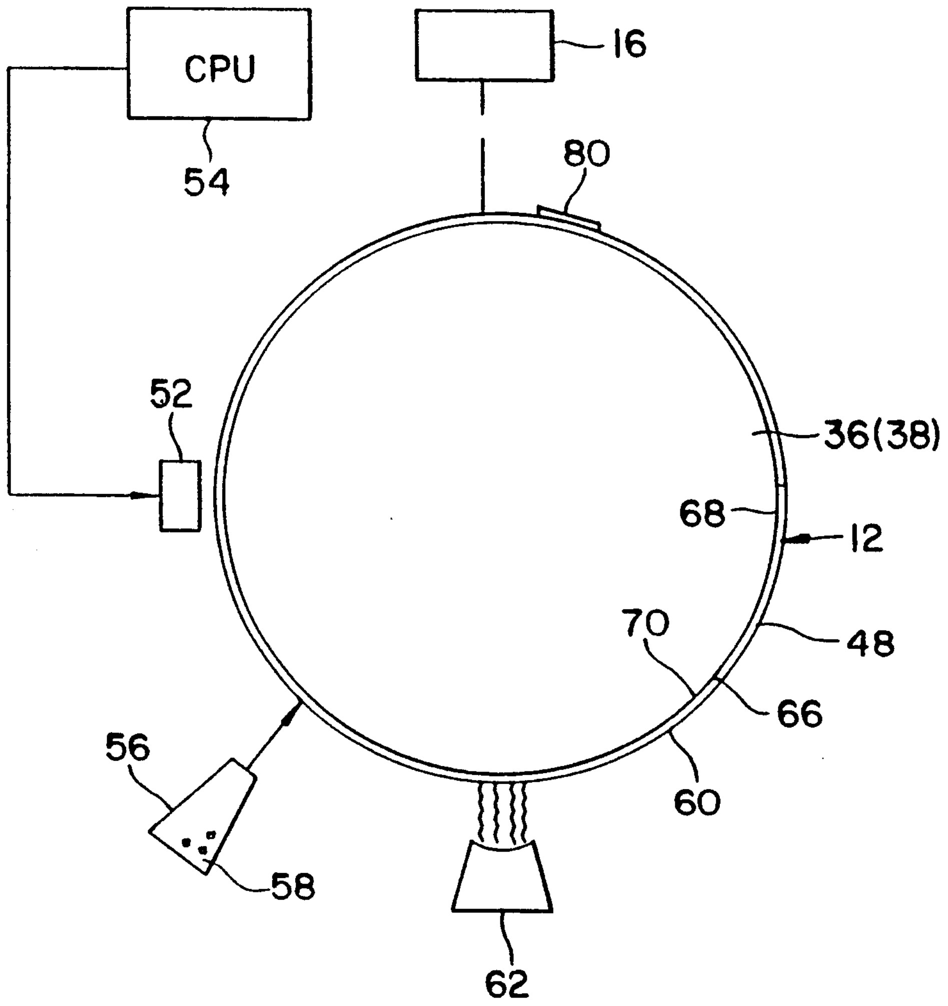
FIG. 4 is a diagrammatic view of another embodiment of the imaging system of the present invention.

Another embodiment of the present invention is illustrated in FIG. 4, in which like reference numerals designate like parts. In this embodiment, the film 48 is first placed over the outer surface 66 of the print roll 36 or 38, such as by adhesive, as previously described. In one form, the film 48 has an outer surface which is magnetically addressable, such as the material nickel cobalt. In this case, the write heads 52 place the magnetic information of the image, as controlled by the CPU, on the outer surface 60 of the film 48, and when this portion of the film 48 passes beneath the toner device 56, the magnetic particulate material 58 is attracted to the magnetic pattern formed on the outer surface 60 of the film 48. In this case, the image cylinder 44 need not have a magnetically addressable outer surface.

In an alternative form, the image cylinder 44 has a magnetically addressable outer surface 46, and the attached film 48 is magnetically permeable, such that the magnetic image is placed by the write heads 52 onto the outer surface 46 of the image cylinder 44 beneath the film 48. In this case, the particulate material in the toner device 56 is magnetically attracted to the image pattern on the outer surface 46 of the image cylinder 44, and thus forms a pattern in the form of the image 80 on the outer surface 60 of the film 48.

In either event, the magnetic image on the outer surface 60 of the film 48 is bonded by the fusing system 62. Since the film 48 is placed on the plate cylinder 36 or 38, the system 12 eliminates any possible distortion of the film, such as caused by heating. In other respects, the system 12 of FIG. 4 operates in a manner as previously described in connection with the system 12 of FIG. 2.

Figure 5:
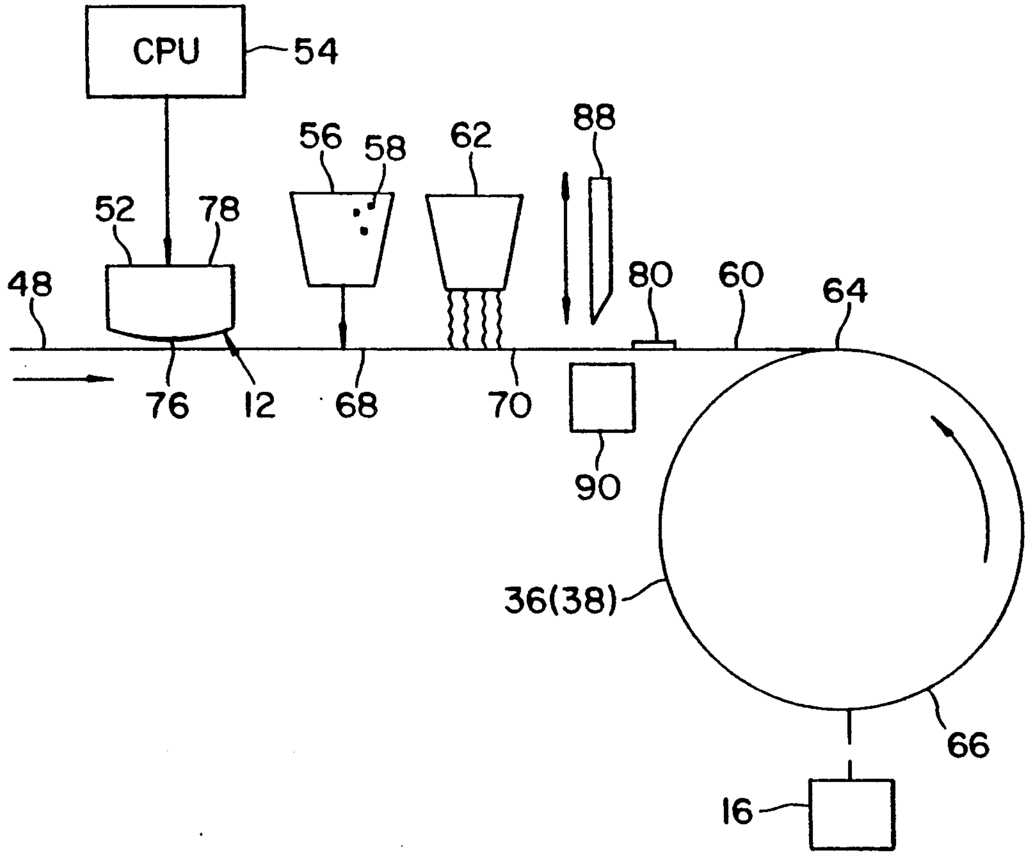
FIG. 5 is a diagrammatic view of another embodiment of the imaging system of the present invention.

Another embodiment of the present invention is shown in FIG. 5, in which like reference numerals designate like parts. In this embodiment, the film 48 passes an outer surface 76 of a write device 78 having one or more magnetic write heads 52. In this embodiment, the film 48 has a magnetically addressable outer surface 60, as previously described. The write heads 52 place magnetic information in the form of a print image, as controlled by the CPU, on the outer surface 60 of the film 48, and particulate material is passed by the toner device 56 onto the outer surface 60 of the film 48. In this manner, a print image 80 is formed on the outer surface 60 of the film 48 in the pattern of the image, after which the particulate material is bonded to the film 48 by the fusing system 62, as previously described. The film 48 is then severed into segments 64 by a knife 88 and anvil 90, and the segments 64 are releasably placed on the outer surface 66 of the print roll 36 or 38, in a manner as previously described. In other respects, the system 12 operates substantially in the manner of the system 12 previously discussed in connection with FIG. 2.

The foregoing detailed description has been given for clearness of understanding only, and no unnecessary limitations should be understood therefrom, as modifications will be obvious to those skilled in the art.

What is claimed is:

1. An imaging system for a printing press, comprising:

an imaging device having an outer surface;

a magnetically addressable film;

means for passing the film adjacent the outer surface of the imaging device;

means for writing magnetic information adjacent the outer surface of the imaging device onto the film;

means for passing a magnetic particulate material onto a surface of the film to form an image from the particulate material; and means for bonding the particulate material onto the film, including a print cylinder having an outer surface, means for placing a segment of the film onto the outer surface of the print cylinder, and including means for severing the segments from the film.

2. The system of claim 1 wherein the bonding means comprises means for fusing the particulate material onto the film.

3. The system of claim 1 wherein the passing means comprises means for blowing the particulate material onto the film.

4. The system of claim 1 wherein the writing means includes at least one magnetic write head.

5. The system of claim 1 wherein the writing means includes means for supplying information to the writing means.

6. The system of claim 5 wherein the supplying means comprises a computer.

7. The system of claim 1 wherein the particulate material comprises a toner.

8. The system of claim 1 including a print cylinder having an outer surface, and means for placing a segment of the film onto the outer surface of the print cylinder.

9. The system of claim 8 including means for removing the film from the print cylinder.

10. The system of claim 1 wherein an outer surface of the film is hydrophilic, and in which the particulate material is oleophilic.

11. The system of claim 1 wherein the particulate material is hydrophilic, and in which an outer surface of the film is oleophilic.

12. An imaging system for a printing press, comprising:

an imaging device having an outer surface;

a magnetically addressable film;

means for passing the film adjacent the outer surface of the imaging device;

means for writing magnetic information adjacent the outer surface of the imaging device onto the film;

means for passing a magnetic particulate material onto a surface of the film to form an image from the particulate material; and means for bonding the particulate material onto the film, including a print cylinder having an outer surface, and means for placing a segment of the film onto the outer surface of the print cylinder, wherein the placing means comprises an adhesive.

13. The system of claim 12 wherein the adhesive comprises a heat activated adhesive.

* * * * *